W. K. FREEMAN.
ETHYLENE GENERATOR.
APPLICATION FILED JUNE 19, 1913.
1,233,566.
Patented July 17, 1917.
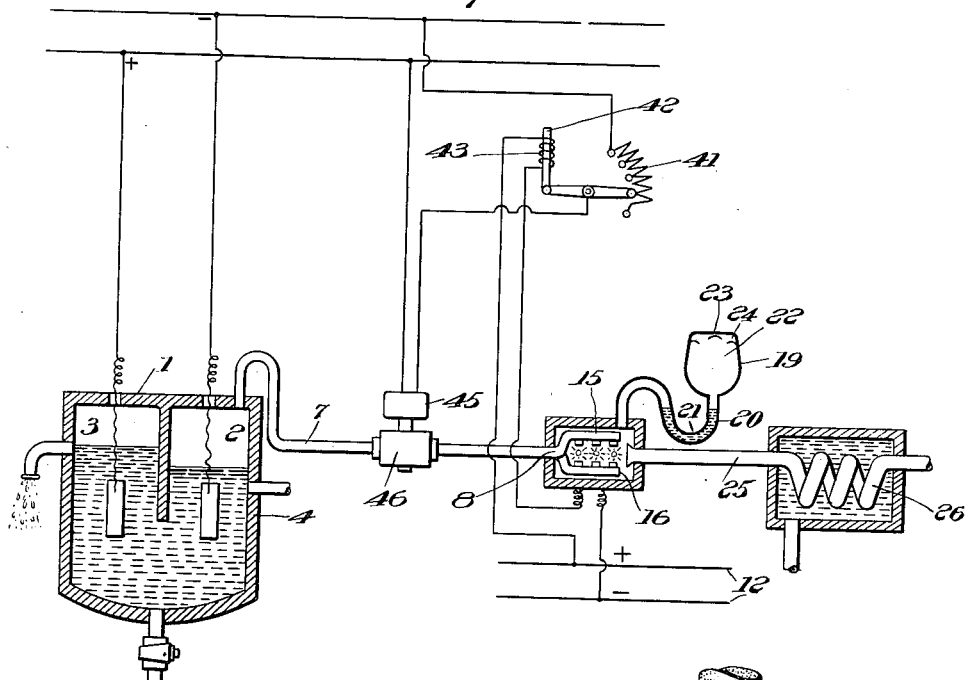
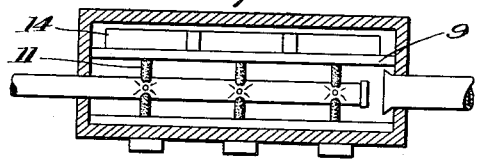
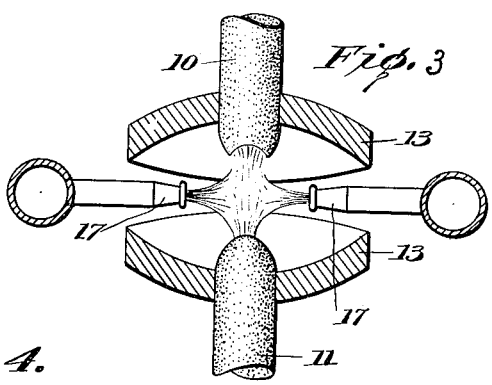
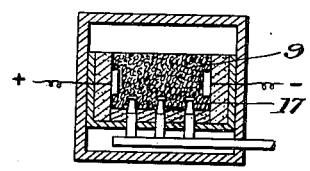
Witnesses
H. F. Rueth
G. M. Copenhaver
Inventor
Walter K. Freeman
By
Chas. C. Stauffer
Attorney

UNITED STATES PATENT OFFICE.

WALTER K. FREEMAN, OF NEW YORK, N. Y.

ETHYLENE-GENERATOR.

1,233,566.  Specification of Letters Patent.  Patented July 17, 1917.

Original application filed April 15, 1911, Serial No. 621,195. Divided and this application filed June 19, 1913. Serial No. 774,637.

*To all whom it may concern:*

Be it known that I, WALTER K. FREEMAN, a citizen of the United States, residing at New York, in the county of New York and State of New York, have invented certain new and useful Improvements in Ethylene-Generators; and I do hereby declare the following to be a full, clear, and exact description of the invention, such as will enable others skilled in the art to which it appertains to make and use the same.

This application is a division of my former application Serial No. 621,195, filed April 15, 1911, method and apparatus for making alcohol.

In my present invention I aim to effect the production of ethylene from generated hydrogen by bringing the hydrogen gas into contact with highly heated carbon. Reactions with carbon do not usually occur save at high temperatures, hence it is necessary to bring the carbons into a state at least of incandescence. The carbon and the hydrogen when brought into contact under the conditions indicated unite to form a gas, ethylene, $C_2H_4$. Ethylene thus produced may be used in the subsequent manufacture of alcohol or ethereal compounds or salts of any kind.

In the drawings,

Figure 1 represents more or less diagrammatically the apparatus which I employ for the production of ethylene.

Fig. 2 is a detail showing the apparatus by means of which I bring the hydrogen and carbon into intimate contact.

Fig. 3 is a detail on a larger scale of one of the carbon arcs of Fig. 2, and,

Fig. 4 is a view showing a modification.

It is generally conceded that hydrogen freely combines with carbon at a high temperature, and it has been proposed hitherto to form ethylene gas by injecting hydrogen into a carbon arc, but previous efforts along this line have, I believe, been unsuccessful for want of a device which would keep the hydrogen and incandescent carbon in contact long enough for the reaction to be made complete. One special feature of my apparatus is the device which I employ for effecting this desired result.

Proceeding to a detailed description of the drawings, 1 represents a water tank having separate upper and lower compartments 2 and 3 open at their bottoms to the main tank, and I provide the compartments, respectively, with negative and positive poles 4 and 5 for the electrolytic decomposition of water. From the negative pole compartment 2 in which the hydrogen is collected, I run one or more pipes 7 which branch at 8 and enter a relatively small substantially airtight chamber 9, which is preferably lined with refractory material and rendered impervious to gas penetration. This chamber is provided with one or more electric arcs; that is, there are one or more sets of negative and positive carbons 10 and 11 suitably arranged and connecting to a suitable electric circuit or circuits 12, and provided with any suitable apparatus for striking the arc and automatically maintaining the same. These carbons are each provided preferably with suitable concave deflectors 13 to assist in preventing the immediate dispersing of the hydrogen atoms from the hot carbon zone. The positive carbons are provided with suitably inclosed regulating apparatus represented at 14, within the chamber. Branch pipes 15 and 16 lead into the chamber 9 and these pipes or nozzles leading therefrom are arranged on opposite sides of the different arcs and are preferably provided with platinum nipples 17 arranged opposite each other in pairs so as to cause two or more opposite jets of hydrogen to impinge upon each other directly in the arc zone, so as to flatten out the incoming gas within the zone into a disk somewhat after the manner of the impinging jets of gas in an acetylene burner. The disks of gas thus created are held in the zone of the highest heat of the arc where the amount of free hot carbon is greatest, by this arrangement, and thereby prolong the opportunity for the reaction between the carbon and hydrogen to occur. That is, the two surfaces of this disk, which should be conceived rather as lenticular, *i. e.*, a little thicker in the middle and thinning out toward the edges in shape, are zones or areas of constant reaction, and it is obvious that if the feed of the hydrogen is correctly proportioned to the amount of current and the amount of liberated carbon, the reaction will be complete. As a matter of fact, I find them practically complete, save for apparently incidental production of acetylene and a few other gases. I provide at the upper part of this chamber 9 a safety pressure relief apparatus 19. As shown, this consists of a gooseneck or U-tube 20, made to contain a suitable liquid 21 and having enlargement 22 with bevel plates 23, 24. In case of any explosion the liquid 21 will be forced into the enlargement 22 and the bevel plates will act to prevent the splashing or loss of the liquid. The height of the column of liquid may be adjusted to the pressure required, and in case of undue pressure the spreading of the liquid in the enlarged chamber will permit the escape of sufficient gas to relieve the pressure in the reaction chamber. This apparatus acts as a seal also to prevent inflow of any atmospher-oxygen into the chamber. Other relief means might be used.

It must be clearly understood that I do not employ any considerable pressure in my reaction chamber. The inflow of hydrogen is proportioned as accurately as may be to its consumption in the arc, and the resulting ethylene gas is withdrawn as rapidly as formed, so that the pressure in this chamber is kept very slightly above normal.

It should be clearly borne in mind that the production of ethylene, or of the ethylene radical depends to a large extent upon the temperature of the carbon of the arc. As a rule, ethylene will not be formed at temperatures much below 2000 C. in the absence of any catalyst. Ethylene may be formed at times at a lower temperature, owing to the presence of a catalytic agent like nickel. The formation of hydrogen and carbon compounds directly, depends upon conditions of temperature, pressure, and the rate at which the hydrogen moves to the carbon, or in other words, the time of contact which is permitted them while they are in active condition. As a rule, the longer the period of contact, the greater the number of atoms of hydrogen which will attach themselves to a carbon molecule. I aim, by the formation of the lenticular shaped zone of hydrogen about the arc, to keep the hydrogen in the immediate vicinity of the glowing and volatilized carbon as long as possible. The formation of the ethylene radicals thus occurs very promptly and completely. Moreover, if any formation of, say, acetylene, $C_2H_2$, occurs, these molecules in passing through the outer zone of the hydrogen have an opportunity to draw to themselves more hydrogen radicals, and, in fact, it is believed that they do so. Moreover, I opine that even if ethane radicals are formed, $C_2H_6$, these are immediately reduced to ethylene, $C_2H_4$, when the molecule passes from the hottest zone immediately in the arc to a comparatively cool zone, where carbon vapor is still present. My researches show me that it is necessary to have the carbon at a very high temperature and to have hydrogen immediately surrounding the carbon in abundance. The result is the formation of the ethylene. I do not care to be bound by the theory just indicated above.

A pipe 25 leads from the chamber 9 through a suitable cooling apparatus in which the pipe is formed in a coil 26. It may not always be necessary to cool the resulting ethylene, and other cooling means, for instance, air cooling, may be employed. From this cooling means the gas is led away to be stored or used, or otherwise disposed of.

I provide a motor 45 to drive a pump 46 located in the pipe 7 to deliver the hydrogen to chamber 9 under pressure. The motor of this pump is in the same circuit as the hydrogen generator, and the electromotive force consumed by it is directly proportional to that consumed in the generation of the hydrogen. I provide a rheostat 41 in the circuit of this pump, and a suitable switch which, when once adjusted to the proper degree, will permit the pump to respond automatically to the required degree in accordance with the energy consumed in the generating cell. I may provide a solenoid 42 which is operated by a coil 43 in circuit with the carbon arc, as shown, and I may connect the armature of this solenoid to the switch of the rheostat 41 so that the current delivered to the arcs controls the position of the rheostat, and this controls the operation of the pump and the delivery of hydrogen. I aim to establish a controlling relation between the energy supplied to the arcs and the energy supplied to the hydrogen generator. I have illustrated one form of this control. Other forms suggest themselves, as for instance, the energy supplied to the arcs might be under direct control of the energy supplied to the generator.

The oxygen generated on the positive side of my generating chamber may be taken off by any suitable means and stored or used, or allowed to go to waste.

I aim to produce the gas in question, namely, ethylene, by causing the gas as it enters the arc zone to take such a form as will retard its escape, and keep it exposed to the attack of free carbon as long as possible. I have indicated herewith my present form of doing this. The shields 13 aid materially in this, as they have a tendency to narrow the opportunities for the hydrogen to escape, and also to reflect or beat back upon the disk of hydrogen referred to impinging particles of hot carbon.

In Fig. 4 I have illustrated another form of apparatus in which the current is passed through a mass of broken carbon in the chamber 9, and the carbon thus volatilized is exposed to the effect of hydrogen gas rising from the nipples 17.

What I claim as new and desire to secure by Letters Patent is:

1. The method of making ethylene synthetically, which consists in passing hydrogen into and through the hot carbon zone of an electric carbon arc inclosed in a substantially air-tight compartment and retaining the hydrogen in said zone long enough to permit the reaction between the hydrogen and the hot carbon to practically complete itself to the formation of ethylene, $C_2H_4$.

2. The method of making ethylene synthetically, which consists in so injecting hydrogen into the zone of the hot free carbon of an electric carbon arc inclosed in a substantially air tight chamber that the hydrogen is retarded and intimately intermingled with the hot, free carbon to form ethylene, the current which supplies the arc and the current which supplies the hydrogen generator being in controlled relation.

3. The method of making ethylene synthetically, which consists in injecting free hydrogen into the zone of the hot free carbon of an electric carbon arc inclosed in a substantially air tight chamber so that the hydrogen may be retained in said arc and intimately intermingled with the carbon for a time sufficient to enable the reaction to be completed and practically all the hydrogen to be converted into ethylene.

4. The method of making ethylene synthetically, which consists in causing jets of hydrogen of equal volume to impinge directly upon each other in the immediate zone of a carbon electric arc, so as to form a lenticular body of gas the outer surfaces of which are exposed to the chemical effect of the highly heated carbon vapors of the arc, whereby ethylene is formed, substantially as described.

5. The method of making ethylene synthetically, which consists in causing a plurality of jets of hydrogen to impinge upon each other within the zone of hot free carbon, of an electric arc inclosed in a substantially air tight compartment so as to retard and intimately intermingle the hydrogen with the carbon to form a hydrocarbon gas, $C_2H_4$.

6. The method of making ethylene which consists in pumping two or more jets of hydrogen under pressure directly into a carbon arc inclosed in a substantially air tight chamber so as to cause the jets to impinge upon one another within the arc to retain the hydrogen atoms within the arc so as to permit the intimate intermingling of such atoms with the free hot carbon atoms of the arc, and maintaining the energy which supplies the arc in controlled relation with the energy which supplies the pump, substantially as described.

7. The method of making ethylene which consists in intimately intermingling hydrogen with free carbon atoms maintained at a high temperature out of contact with oxygen, and establishing a controlling relation between the energy which maintains the carbon in incandescence and the feed of the hydrogen, substantially as described.

8. In apparatus for making ethylene the combination of an inclosed chamber, carbons and conductors for bringing carbon atoms in said chamber to high incandescence, means for introducing hydrogen into said chamber, and for causing intimate mingling of the hydrogen and incandescent carbon whereby ethylene may be formed, substantially as described.

9. In apparatus for making ethylene the combination of an inclosed chamber, carbons and conductors within said chamber for maintaining carbon in a state of incandescence, and means whereby jets of gas may be projected in impinging relation upon each other within said chamber, substantially as described.

10. In apparatus for making ethylene the combination of suitable means whereby carbon particles may be maintained in a state of incandescence, pipes or nozzles for directing jets of gas one against each other in intermingled relation with said incandescent carbon, the means for effecting the incandescence of the carbon being in controlled relation to the means for feeding the gas, substantially as set forth.

11. In apparatus for making ethylene the combination of a hydrogen generator, means whereby current may be supplied to said generator, means for removing hydrogen from said generator, a pump in shunt relation with the circuit whereby the hydrogen is generated, for feeding the generated hydrogen, a chamber, incandescent arcs in said chamber, means for feeding hydrogen in impinging relation within said incandescent arcs, the energy which feeds the arcs being in controlled relation with the energy which actuates the generator, deflectors for confining the incandescent carbon and the impinging hydrogen in a zone of active relation, and means for withdrawing the formed ethylene, substantially as described.

12. In apparatus for making ethylene the combination of an inclosed chamber, one or more electric carbon poles arranged within the chamber, a plurality of nozzles arranged on opposite sides of each set of poles in proximity thereto to direct jets of hydrogen against each other directly between the carbons, means conducting the hydrogen to the nozzles, means for retarding or retaining the hydrogen in proper relation to the poles, and means for withdrawing the ethylene so formed.

13. In apparatus for making ethylene, the combination of a hydrogen generator, means for leading hydrogen therefrom, a substantially air tight chamber provided with one or more carbon arcs, a plurality of nozzles arranged within the chamber adjacent each arc to engage opposing streams of hydrogen one against the other within the arc, platinum nipples for said nozzles, means for conveying the hydrogen from said source to said nozzles, a safety pressure device for relieving excessive pressure within the chamber, means for conveying the hydrocarbon so produced from said chamber, and means for cooling said hydrocarbon, substantially as described.

14. The method of making ethylene which consists in heating carbon to a temperature of at least 2000 C. and maintaining, in the immediate vicinity of such hot carbon, an atmosphere of hydrogen.

15. The method of making ethylene which consists in maintaining carbon at a temperature approaching volatilization and causing a flow of hydrogen to said carbon, under such conditions as to maintain in the immediate vicinity of the hot carbon, an atmosphere of hydrogen.

16. The method of making ethylene which consists in maintaining carbon at a temperature approaching volatilization, causing a flow of hydrogen to said carbon, under such conditions as to maintain in the immediate vicinity of the hot carbon, an atmosphere of hydrogen, and withdrawing the ethylene vapor so formed.

In testimony whereof I affix my signature, in the presence of two subscribing witnesses.

WALTER K. FREEMAN.

Witnesses:
 JNO. S. GEORGE,
 MARY B. SABIN.